(No Model.)
H. NASS.
FILE.
No. 583,869.  Patented June 1, 1897.
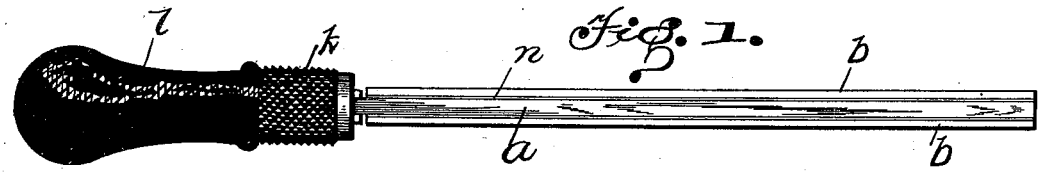
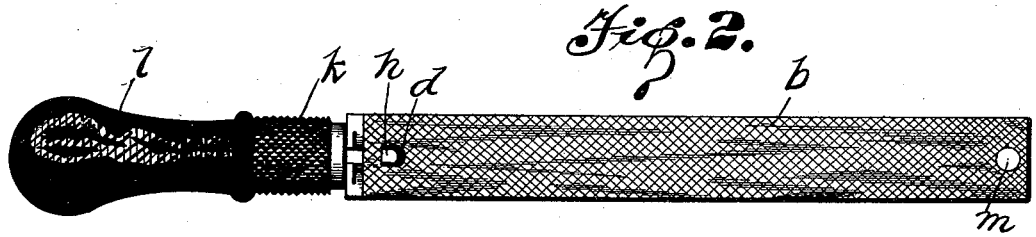
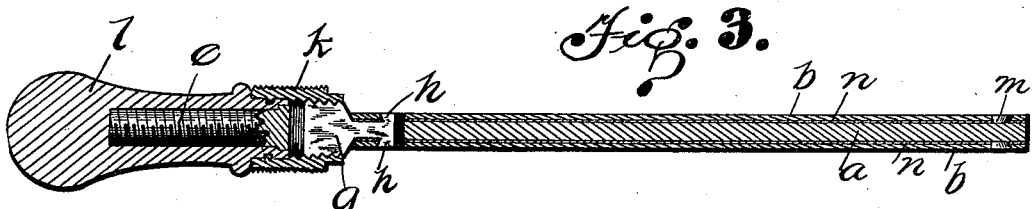
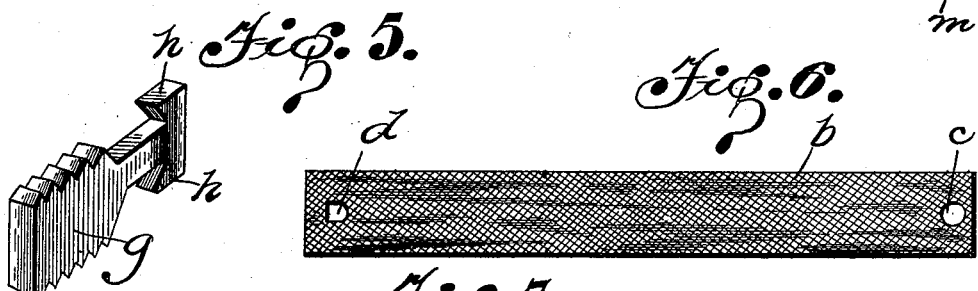
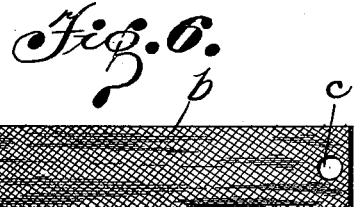
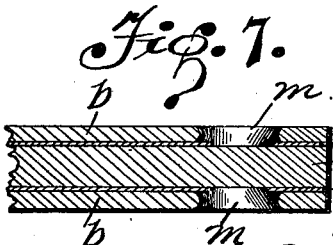
Witnesses:
A. R. Appleman Jr.
A. W. Wilson
Inventor:
Hermann Nass
By Henry C. Evert, Att'y.

UNITED STATES PATENT OFFICE.

HERMANN NASS, OF PITTSBURG, PENNSYLVANIA.

FILE.

SPECIFICATION forming part of Letters Patent No. 583,869, dated June 1, 1897.

Application filed December 7, 1896. Serial No. 614,777. (No model.)

*To all whom it may concern:*

Be it known that I, HERMANN NASS, a citizen of the United States of America, residing at Pittsburg, in the county of Allegheny and State of Pennsylvania, have invented certain new and useful Improvements in Files, of which the following is a specification, reference being had therein to the accompanying drawings.

This invention relates to certain new and useful improvements in files, and has for its object to provide new and novel means whereby the file-blade may be reversed and both sides utilized until worn out and a new file-blade then substituted.

The invention further aims to construct a file that will be extremely simple in its construction, strong, durable, effectual in its operation, and comparatively inexpensive to manufacture; furthermore, to provide double the filing-surface that is obtained with the ordinary file.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a side view of my improved file, showing both blades in position. Fig. 2 is a plan view. Fig. 3 is a vertical longitudinal sectional view. Fig. 4 is a plan view of the bar with file-blade-securing mechanism and handle removed. Fig. 5 is a perspective view of the fastening-bar. Fig. 6 is a plan view of one of the file-blades. Fig. 7 is a vertical longitudinal sectional view of a portion of the bar and blades.

Referring to the drawings by reference-letters, $a$ represents the bar, on which are secured the file-blades $b$ $b$, provided near the outer end with an aperture $c$ and near the inner end with an aperture $d$. The bar $a$ is provided on its inner end with a shank $e$, screw-threaded on its outer end, said bar and shank having a slot $f$ extending in alinement therewith and adapted to receive the fastening device, consisting of a bar $g$, screw-threaded on its two edges for about half the length of the bar and provided on the opposite end with engaging lugs $h$ $h$, formed by recesses cut in the edges of the bar between the screw-threads and the opposite end and adapted to engage the file-blades in the aperture $d$. The screw-threaded end of the fastening-bar is adapted to receive a collar or sleeve $k$, which is swiveled or otherwise loosely held upon the inner end of the handle and turns freely thereon. The end of this sleeve next to the files is internally screw-threaded, so as to engage with the thread upon the inner end of the bar, and the outer surface of the sleeve is corrugated, cross-checked, or roughened in any manner so as to enable it to be freely turned by hand. This handle $l$ is also adapted to engage on the screw-threaded end $e$ of the bar $a$, which is provided on the outer end with studs $m$ $m$, projecting on each side and adapted to engage in the apertures $c$ $c$. These studs are provided with heads slightly enlarged to the size of the shank to permit of locking the file-blade securely on the bar $a$, the aperture $c$ being adapted to conform to the studs. The bar $a$ is provided on its two sides with a suitable covering $n$, which serves to protect the face of the file lying next the bar and prevent injury to same. In actual practice I have found paper to be the most satisfactory material to be employed for this covering or packing, though I do not wish to limit myself to this specific material.

The assembling of the parts will be readily apparent from the views that I have shown in the drawings, and we will now assume that it is desired to remove the file-blade from either or both sides. The sleeve is turned on the end of the handle and this forces the bar $g$ outward sufficiently far to permit the lugs $h$ $h$ being disengaged from the file-blades, which can then be easily removed from the bar $a$ by lifting on the file, disengaging same from its stud $m$.

To replace the file, the same is placed on the stud $m$ and in engagement with the lug $h$. The collar $k$ is then turned to tighten the lugs $h$ $h$ against the file and hold the same. The handle $l$ is then turned so as to bring the flange formed on same against the collar and tightening all parts firmly in position. By this construction a considerably thinner blade may be employed, as the blade $a$ will serve to strengthen the file to a much greater extent than is obtained by a heavy file-scraper. When one side of the file-blade is worn, the blade may be reversed, so as to bring the other side into use, permitting the use of the file until the four sides of the blade have become worn, when they may be removed and new ones substituted.

Particular attention is directed to the special construction of the handle, as the latter is so made that it will not split or break; furthermore, will prevent accidents that are now of common occurrence.

It will also be noted that various changes may be made in the details of construction without departing from the general spirit of my invention.

Having fully described my invention, what I claim as new, and desire to secure by Letters Patent, is—

1. In a file, a bar provided at its outer end with means for attachment with the outer ends of the files which are applied to its sides, and at its inner end with a threaded shank, and a slot to receive a clamping or fastening plate, combined with an internally-threaded handle, a screw-collar secured to the handle, and a clamping or fastening plate placed in the slot in the bar, and which plate has means upon its outer end to engage with the inner ends of the files applied to opposite sides of the bar, and a screw-thread upon its inner end to engage with the collar on the handle; and the two files, each provided with a perforation at each end, substantially as shown.

2. In a file, the bar $a$ provided with the threaded shank $e$ and slot $f$ at its inner end, and with the projections $m$ at its outer end, and the handle $l$, internally threaded to receive the shank $e$, and provided with the internally-threaded collar $k$, combined with a separate clamping or fastening plate $g$, which is placed in the slot $f$, and which is provided with the hooks or catches $h$, at its outer end, and is screw-threaded at its inner one; and the two files applied to opposite sides of the bar, and provided with perforations at both ends, substantially as described.

In testimony whereof I affix my signature in presence of two witnesses.

HERMANN NASS.

Witnesses:
H. C. EVERT,
H. E. SEIBERT.